UNITED STATES PATENT OFFICE.

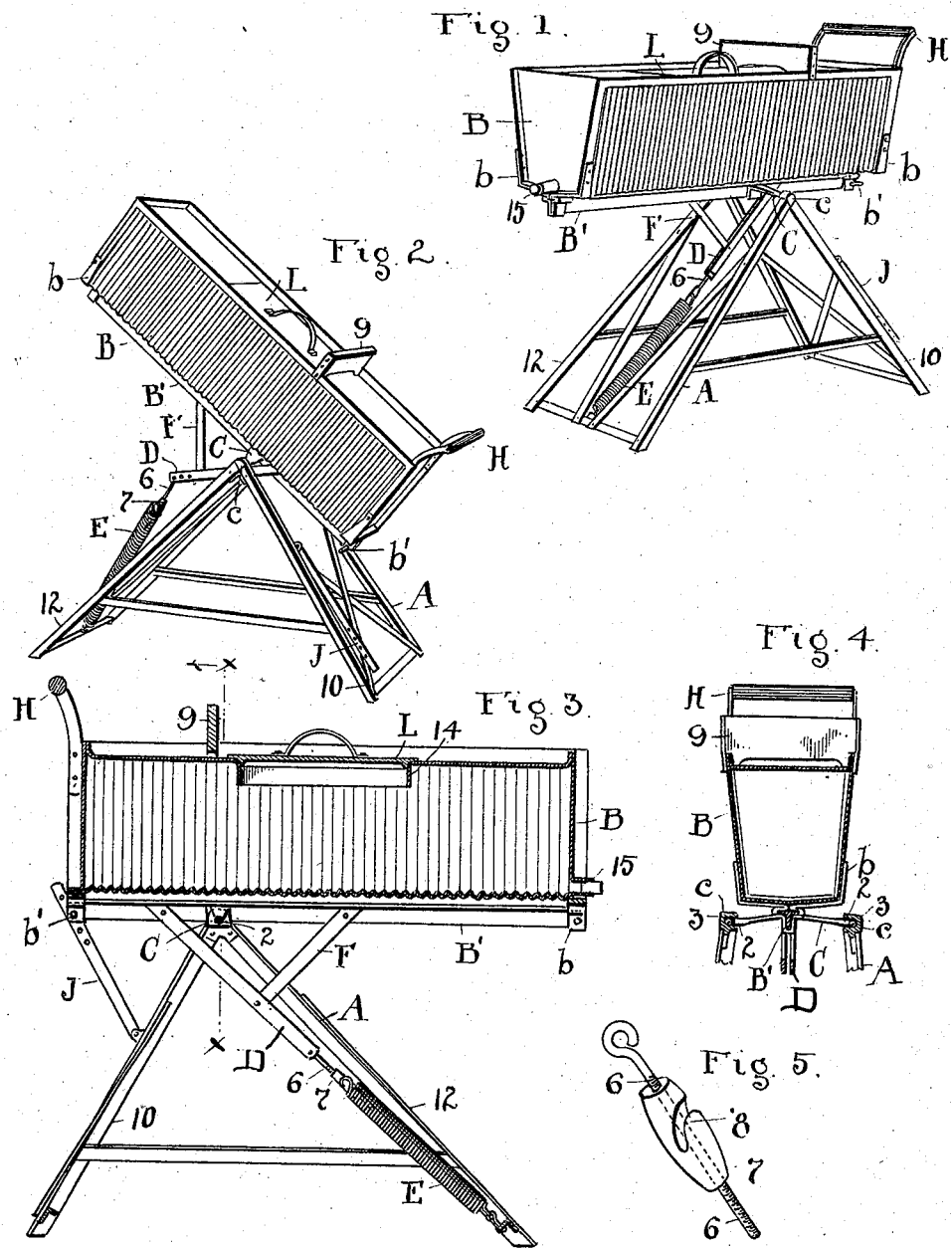

ROBERT E. CAMPBELL, OF WATSONVILLE, CALIFORNIA.

WASHING-MACHINE.

No. 866,912.          Specification of Letters Patent.          Patented Sept. 24, 1907.

Application filed December 1, 1905. Serial No. 289,753.

*To all whom it may concern:*

Be it known that I, ROBERT E. CAMPBELL, a citizen of the United States, residing at Watsonville, in the county of Santa Cruz and State of California, have invented certain new and useful Improvements in Washing-Machines, and do declare that the following is a full, clear, and exact description of the invention, which will enable others skilled in the art to which it appertains to make and use the same.

My invention relates to washing machines, and the invention consists in a counterbalanced tilting machine, all substantially as shown and described and particularly pointed out in the claims.

Figure 1 is a perspective view of the machine with the tank in a horizontal position, and Fig. 2 is a like view with the tank in tilted position. Fig. 3 is a sectional elevation of the machine lengthwise with the tank normal or horizontal, and Fig. 4 is a cross section on line $x, x$, Fig. 3, looking to the left. Fig. 5 is a detail of an adjustable swivel mechanism for controlling the tension of the equalizing spring.

In the drawings as thus shown A represents the supporting frame of the machine which is preferably knockdown in construction for convenience in shipping, and B is the body or tank in which the washing is done. The said frame is preferably substantially V shape in side elevation, though one side is longer than the other, and has the tank B with its own immediate support mounted to tilt thereon. Said tank support comprises a T shaped longitudinal bar B′ and cross straps $b$ at the ends thereof bent closely around the sides of bar B′ and riveted to tank or box B to make said bar rigid with said tank. The tank B is preferably made of sheet metal corrugated at the bottom and sides, and is pivoted on frame A by means of a transverse pivot bar or shaft C bent at its middle to embrace the sides of central longitudinal bar B′ and provided with rounded extremities 2 engaged in corresponding bearings 3 in the apex of frame A. The said bearings comprise separate castings $c$ and the ends of cross pivot shaft C has antifriction balls in said bearings to facilitate rotation.

The machine is designed to be operated by hand, and auxiliary to this power and as a balancing or counterbalancing medium I employ a mechanism which may be largely varied and serve every purpose, but in this instance comprising an inclined rigid arm D which is fixed upon central bar B′ at its short end as compared with pivot C and a short distance behind said pivot and extends thence forward beneath said pivot to a point forward thereof approximately beneath the middle of tank B, where engagement is made with spiral spring E attached at its other end at or near the base of frame A. Said spring E constitutes a direct extension of arm D by being in line therewith, and is designed to balance the operations of the machine and to help maintain the horizontal position of the tank under normal conditions, as hereinafter more fully described. A rigid brace F forward from arm D sustains its lower end and mechanically connects the same with tank B forward of pivot C.

Now, it will be observed that the machine is built on geometrical principles. The frame is preferably the angle of a square or a right angle. The tilting bar B′ carrying body B is hung at about one third its length over to the handle side, which leaves the long end of the tank on the opposite side of pivot C. I can of course hang said parts differently but have found that with one third the length on the handle side of the pivot and two thirds on the other side I get the most satisfactory action and results.

The balancing spring is adjusted for tension and take up by means of a rod 6 hooked at one end to inclined arm D and carrying a hook nut 7 with a hook 8 in its side upon which spring E is engaged. Said nut is preferably of barrel shape so as to adapt the longer end to project into the upper end of spring E more or less and thus prevent the hook from bending over and rod 6 from rubbing inside the spring.

To hold the machine fixedly against tilting while wringing or at other times I employ a brace or rod J, pivoted on frame A and having holes adapted to be engaged over pin or projection $b'$. When not in use said brace drops down out of the way. The wringer is designed to be supported upon cross piece 9 directly upon the machine over pivot C, from which the water runs back into the machine, and the top of the tank is depressed below the sides and ends thereof for this purpose.

Preferably the rear legs 10 of the machine are shorter than front legs 12, which economizes material but does not change the angle at the long end for the spring hanger. This also makes the frame more compact than would be with legs of equal length and will save enough angle iron on a thousand machines to build sixty.

As to the tank, I find a flat corrugated bottom and ten or twelve inches width of bottom the best, but must have at least fifteen inches width on top to take a large wringer. So I am making tank B fifteen inches across on top and ten to twelve on bottom with a slight slope from the sides to the center of bottom so that play in center at bottom on long end of tank will drain out all the water. A flange 14 all around the top opening extends down inside, say one and a half inches to prevent water splashing out when in operation even though the lid or cover L be left off, and a plugged outlet 15 is provided at the long end of the tank.

It is to be particularly observed that this is essentially a tilting machine and not a mere rocking machine with a middle pivot. This follows by reason of the pivoting of the tank near one end and leaving approximately two thirds its length beyond the pivot and with the handle at the short end. Thus as the operator moves the short end through an arc of a circle the distance traveled by the longer end would be about twice as great, thus enabling a movement or action to be thrown into the water not possible with a tank pivoted at its center in a hand operation, and which clearly differentiates this machine from the old fashioned middle pivoted rocking machines.

What I claim is:—

1. In washing machines, a supporting frame, in combination with a tank having greater length than width pivoted thereon off its center of gravity, and a spring mechanism to maintain the equilibrium of the tank comprising an arm D engaged with the bottom of the tank at one side of its pivot and projecting to the other side beneath the pivot and the spring connected with the free end of said arm substantially in alinement therewith and affixed at the bottom of the supporting frame.

2. In washing machines, a supporting frame, in combination with an oblong washing tank pivoted thereon off its center, and means to counterbalance the longer end of said tank and hold the tank in a substantially horizontal position, comprising an arm fixed to the bottom of the short end of the tank and extending at an inclination therefrom to opposite side of the pivot of the tank, and a spring connected with said arm in alinement therewith.

3. In washing machines, a supporting frame and a washing tank of greater length than width pivoted on said frame off its middle, in combination with an inclined arm D depending from the short end of said tank behind said pivot and extending beneath and forward thereof beneath the long end of the tank, a spring E connecting said arm with the base of said supporting frame beneath the longer end of said tank and a brace arm F from approximately the middle of the tank to said arm D above said spring, thereby bringing said arms into substantially V relation beneath the pivot of the tank.

4. In washing machines, a supporting frame, a washing tank pivoted off its center lengthwise on said frame, a depending arm D engaged with the short end of said tank behind its pivot, a retracting spring E engaged with the free end of said arm, and an arm F connecting said arm D with the bottom of the long end of the tank on the opposite side of the pivot, whereby the spring exerts a direct pull as to both ends of the tank, according to its position.

In testimony whereof I sign this specification in the presence of two witnesses.

ROBERT E. CAMPBELL.

Witnesses:
W. H. CAMPBELL,
J. E. GARDNER.